(12) United States Patent
Cook et al.

(10) Patent No.: US 7,043,564 B1
(45) Date of Patent: May 9, 2006

(54) METHODS AND APPARATUS FOR MANAGING NETWORK TRAFFIC USING NETWORK ADDRESS TRANSLATION

(75) Inventors: Michael Cook, Lexington, MA (US); Enguang He, Nashua, NH (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 10/075,072

(22) Filed: Feb. 12, 2002

(30) Foreign Application Priority Data

Aug. 18, 1999 (WO) .................. PCT/JP99/04438

(51) Int. Cl.
*G06F 15/16* (2006.01)
*G06F 15/173* (2006.01)

(52) U.S. Cl. ................ 709/246; 709/245; 709/223
(58) Field of Classification Search ........ 709/224–229, 709/231–232, 237, 245–247; 370/389, 401, 370/385.54
See application file for complete search history.

(56) References Cited

U.S. PATENT DOCUMENTS

| | | | | |
|---|---|---|---|---|
| 6,006,272 A | * | 12/1999 | Aravamudan et al. | 709/245 |
| 6,192,404 B1 | * | 2/2001 | Hurst et al. | 709/224 |
| 6,360,265 B1 | * | 3/2002 | Falck et al. | 709/227 |
| 6,493,765 B1 | * | 12/2002 | Cunningham et al. | 709/245 |
| 6,697,377 B1 | * | 2/2004 | Ju et al. | 370/466 |
| 6,735,634 B1 | * | 5/2004 | Geagan et al. | 709/235 |
| 6,757,290 B1 | * | 6/2004 | Kalmanek et al. | 370/401 |
| 2001/0032270 A1 | * | 10/2001 | Koo | 709/237 |
| 2005/0027875 A1 | * | 2/2005 | Deng | 709/231 |

OTHER PUBLICATIONS

Brassil, J et al. Program Insertion in real-time IP multicasts ACM SIGCOMM Computer Communication Review, vol. 29, Issue 2, Apr. 1999 pp. 49-68.*
Schulzrinne, H. et al. Real Time Streaming Protocol (RTSP), RFC 2326, Apr. 1998.*
Schulzrinne, H. et al. RTP: A transport Protocol for Real-Time Applications, RFC 1889, Jan. 1996.*

* cited by examiner

*Primary Examiner*—David Wiley
*Assistant Examiner*—Joseph E. Avellino
(74) *Attorney, Agent, or Firm*—BainwoodHuang; David E. Huang, Esq.

(57) ABSTRACT

A method manages network traffic using NAT in a data communications device having a NAT data structure (e.g., a NAT table). The method includes the step of creating, in the NAT data structure, a first entry to coordinate a first data flow from a server to a client (e.g., a video channel or an audio channel of an RTSP session), and concurrently creating a second entry to coordinate a second data flow from the client to the server (e.g., a video control channel or an audio control channel of the RTSP session). The method further includes the steps of conveying a data element (e.g., a UDP packet) of the first data flow from the server to the client based on the first entry, and conveying a data element of the second data flow from the client to the server based on the second entry.

4 Claims, 8 Drawing Sheets

| | FIRST NETWORK DATA | | | SECOND NETWORK DATA | | | |
|---|---|---|---|---|---|---|---|
| SOURCE ADDRESS | PORT NUMBER | DESTINATION ADDRESS | PORT NUMBER | SOURCE ADDRESS | PORT NUMBER | DESTINATION ADDRESS | PORT NUMBER |
| 3.3.3.3 | 6970 | 1.1.1.1 | 5555 | 2.2.2.2 | 6970 | 1.1.1.1 | 5555 |
| 1.1.1.1 | 5556 | 3.3.3.3 | 6971 | 1.1.1.1 | 5556 | 2.2.2.2 | 6971 |

| FIRST NETWORK DATA | | SECOND NETWORK DATA | |
|---|---|---|---|
| SOURCE ADDRESS / PORT NUMBER | DESTINATION ADDRESS / PORT NUMBER | SOURCE ADDRESS / PORT NUMBER | DESTINATION ADDRESS / PORT NUMBER |
| 3.3.3.3/6970 | 1.1.1.1/5555 | 2.2.2.2/6970 | 1.1.1.1/5555 |
| 1.1.1.1/5556 | 3.3.3.3/6971 | 1.1.1.1/5556 | 2.2.2.2/6971 |
| ... | ... | ... | ... |

FIG. 4

METHODS AND APPARATUS FOR MANAGING NETWORK TRAFFIC USING NETWORK ADDRESS TRANSLATION

BACKGROUND OF THE INVENTION

Real-Time Streaming Protocol (RTSP) traffic typically utilizes a number of different protocols such as the Transmission Control Protocol (TCP), the User Datagram Protocol (UDP), the Real-Time Transport Protocol (RTP) and the RTP Real-Time Control Protocol (RTCP). In particular, a single RTSP session typically includes five network channels: (i) a control channel formed by a TCP connection between a client and a server, (ii) a video channel formed by a flow of UDP packets in RTP format with encoded moving images from the server to the client, (iii) an audio channel formed by a flow of UDP packets in RTP format with encoded sound from the server to the client, (iv) a video feedback channel formed by a flow of UDP packets in RTCP format with video stream control information from the client to the server, and (v) an audio feedback channel formed by a flow of UDP packets in RTCP format with audio stream control information from the client to the server.

Suppose that a client on the Internet obtains streaming data from a server in a local area network (LAN) through a conventional gateway (or router) using RTSP. Furthermore, suppose that this gateway is configured for Network Address Translation (NAT). To this end, the client on the Internet initiates an RTSP session by sending a packet (i.e., a "SYN" packet) to the gateway's Internet Protocol (IP) address. The gateway receives the packet, and adds an entry to its NAT table so that it can direct the packet from the client on the Internet to the server in the LAN and vice versa through the TCP connection. The gateway then sends the packet to the server. At this point, the gateway can properly direct subsequent packets sent through the TCP connection between the client and the server using the configured NAT table, e.g., control packets exchanged between the server and the client when negotiating port numbers for the UDP channels.

In addition to the TCP connection, the RTSP session requires a video channel for streaming video content and an audio channel for streaming audio content from the server to the client. In a similar manner to that described above for establishing the TCP connection, the gateway receives a video channel UDP packet from the server on its way to the client (in accordance with RTP), configures its NAT table (e.g., in preparation for any response packets coming back from the client) and sends that packet onto the client. Additionally, the gateway receives an audio channel UDP packet from the server, configures its NAT table and sends that packet onto the client.

The RTSP session also requires a video control channel and an audio control channel from the client to the server. For the video control channel, the gateway receives a video control UDP channel packet (in accordance with RTCP), and configures its NAT table to properly direct that video control channel UDP packet and future video control UDP channel packets from the client to the server. Similarly, for the audio control channel, the gateway receives an audio control UDP channel packet, and configures its NAT table to properly direct that audio control channel UDP packet and future audio control UDP channel packets from the client to the server. The gateway then conveys UDP packets on the video control channel and on the audio control channel from the client to the server.

As briefly mentioned above, the port numbers for the four UDP channels (i.e., the video channel, the audio channel, the video control channel and the audio control channel) are selected dynamically. In particular, the server and the client negotiate the actual UDP port numbers through the TCP connection. In accordance with RTSP, the UDP port numbers for the video control channel and the audio control channel are one more than the UDP port numbers for the video channel and the audio channel. That is, if the video channel uses port number Y, the video control channel uses port number Y+1. Similarly, if the audio channel uses port number Z, the audio control channel uses port number Z+1.

As the RTSP session continues, the gateway translates addresses so that TCP and UDP packets delivered to the client appear to have originated from the gateway. Accordingly, the gateway is considered to be a proxy for the server, i.e., a reverse proxy. Later, when the gateway observes tearing down of the TCP connection, the gateway typically adjusts the NAT table (i.e., deletes the NAT table entries) to disable NAT for the TCP connection.

In some situations, there may be multiple servers in order to increase server capacity. In such situations, the conventional gateway can be configured to handle RTSP traffic by selecting among the multiple servers for load balancing purposes. Here, the gateway is essentially a reverse proxy operating on behalf of the multiple servers, i.e., a front-end to the multiple servers making those servers appear to be at a single IP address on the Internet.

SUMMARY OF THE INVENTION

Unfortunately, there are deficiencies to the above-described situation in which a conventional gateway handles RTSP traffic by load balancing RTSP traffic among multiple servers. For example, the conventional gateway does not reliably handle RTCP channels correctly when operating as a reverse proxy on behalf of multiple servers. This deficiency will now be explained in further detail.

Suppose that a client on the Internet sends a request for streaming content to a gateway operating as a reverse proxy on behalf of multiple servers in a LAN. In this situation, the client initiates an RTSP session by sending a "SYN" packet to the gateway's IP address. The gateway selects (e.g., in a round-robin manner) one of the multiple servers to handle the RTSP session, adds an entry to its NAT which enables the gateway to translate packets exchanged between the client and the selected server, and sends the "SYN" packet on to the selected server in order to establish a TCP connection between the client and that server for the RTSP session.

For the video channel of the RTSP session, the selected server provides a sequence of video channel UDP packets to the gateway. Upon receipt of the first UDP video channel packet, the gateway adds another entry to the NAT table (e.g., for any response packets coming back from the client), and directs the video channel packet and subsequent video channel packets from the selected server to the client.

Similarly, for the audio channel of the RTSP session, the selected server provides a sequence of audio channel UDP packets to the gateway. Upon receipt of the first UDP audio channel packet, the gateway adds yet another entry to the NAT table, and directs the audio channel packet and subsequent audio channel packets from the selected server to the client.

However, for the video control channel of the RTSP session, the gateway initially receives a video control channel UDP packet, and the gateway unfortunately does not know where to direct that UDP packet, i.e., to which of the multiple servers that UDP packet should be sent to. This is because the video control channel UDP packet comes on a port number that is different from all of the other port numbers of the RTSP session (i.e., the port number for the video channel is Y but the port number for the video control channel is Y+1). The gateway searches its NAT table and finds no entry for the video control channel UDP packet, and thus does not know what to do with that packet. Accordingly, the gateway might select one of the multiple servers (e.g., in a round-robin manner) and send that packet to the selected server. In this situation, the selected server may not be the RTSP session server, i.e., the earlier-selected server that has the established TCP connection with the client and that is providing the video and audio channels to the client. Alternatively, the gateway might drop the video control channel UDP packet. In either case, it is very possible that the RTSP session server will not receive video control channel UDP packets from the client. Similarly, it is quite possible that the RTSP session server will not receive audio control channel UDP packets from the client.

The invention is directed to techniques for managing network traffic (e.g., RTSP traffic) using NAT by creating an additional NAT entry for a second communications channel at the same time or near the time in which an initial NAT entry for a first communications channel is created. Such techniques facilitate certain types of communications (e.g., video and audio control channels for an RTSP session) between one device (e.g., a client) on one end, and a selected one of a group devices (e.g., one of multiple servers) on the other end. For example, a data communications device can impose a static rule that creates multiple NAT entries (e.g., an N-tuple of entries) in response to packets for particular port numbers for the first and second channels. As another example, a server can issue a command to a data communications device to direct the data communications device to create a NAT entry for the second channel at or near the time it sends a communications signal through the data communications device to create a NAT entry for the first channel. In either case, such operation can prevent a situation in which a reverse proxy gateway receives a UDP packet for a video control channel or an audio control channel of an RTSP session, but does not know where to direct it.

One embodiment of the invention is directed to a method for managing network traffic using NAT in a data communications device having a NAT data structure (e.g., a NAT table). The method includes the step of creating, in the NAT data structure, a first entry to coordinate a first data flow from a server to a client (e.g., a video channel or an audio channel of an RTSP session), and concurrently creating a second entry to coordinate a second data flow from the client to the server (e.g., a video control channel or an audio control channel of the RTSP session). The method further includes the steps of conveying a data element (e.g., a UDP packet) of the first data flow from the server to the client based on the first entry, and conveying a data element of the second data flow from the client to the server based on the second entry.

In another embodiment of the invention, the method includes the step of conveying a data element of a first data flow from a server to a client and concurrently creating, in the NAT data structure, a first entry to coordinate the first data flow from the server to the client. The method further includes a step of receiving a command from the server and creating, in the NAT data structure, a second entry to coordinate a second data flow from the client to the server in response to the command. The method further includes the step of conveying a data element of the second data flow from the client to the server based on the second entry.

In one arrangement, the first entry can include a port number X and the second entry can include a port number X+1 where X is a positive integer. This arrangement is well-suited for an RTSP session since the video channel uses port Y (e.g., in the range 6970 to 7170) and the video control channel uses port Y+1, and since the audio channel uses port Z and the audio control channel uses port Z+1.

The features of the invention, as described above, may be employed in systems, data communications devices and methods, as well as other computer-related components such as those of Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a block diagram of a network address translation table which is suitable for use by the data communications device of FIG. 2.

DETAILED DESCRIPTION

The invention is directed to techniques for managing network traffic (e.g., RTSP traffic) using NAT by creating an additional NAT entry for a second communications channel at the same time or near the time in which an initial NAT entry for a first communications channel is created. Such techniques facilitate certain types of communications (e.g., video and audio control channels for an RTSP session) between one device (e.g., a client) on one end, and a selected one of a group devices (e.g., one of multiple servers) on the other end. For example, a data communications device can impose a static rule that creates multiple NAT entries (e.g., an N-tuple of entries) in response to packets for particular port numbers for the first and second channels. As another example, a server can issue a command to a data communications device to direct the data communications device to create a NAT entry for a second channel at or near the time it sends a communications signal through the data communications device to create a NAT entry for a first channel. In either case, such operation can prevent a situation in which a data communications device, such as a reverse proxy gateway, receives a UDP packet for a video control channel or an audio control channel of an RTSP session, but does not know where to direct it.

Figure 1:
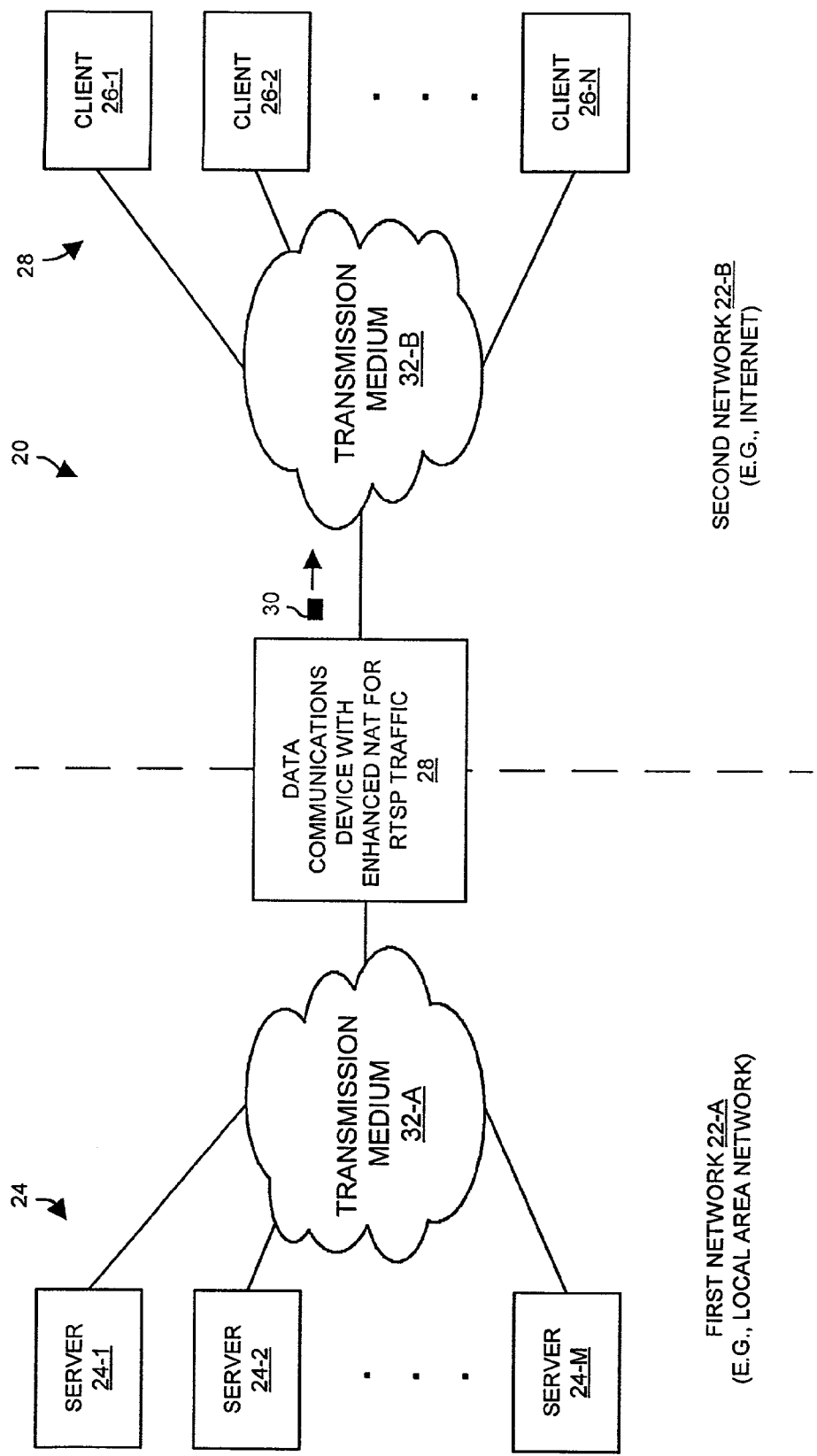
FIG. 1 is a block diagram of a network system which is suitable for use by the invention.

FIG. 1 is a block diagram of a communications system 20 which is suitable for use by the invention. The communications system 20 includes a first network 22-A (e.g., a LAN) and a second network 22-B (e.g., the Internet). A set of servers 24-1, ..., 24-M (collectively, servers 24) reside in the first network 22-A, and a set of clients 26-1, ..., 26-N (collectively, clients 26) reside in the second network 22-B. A data communications device 28 (e.g., a gateway, a bridge, a router, a firewall, etc.) connects the two networks 22-A, 22-B thus allowing the servers 24 and the clients 26 to communicate with each other using signals 30. By way of example only, the first network 22-A includes a transmission medium 32-A and the second network 22-B includes a transmission medium 32-B (e.g., combinations of cables, other data communications devices, etc.) which are interconnected between the servers 24, the clients 26 and the data communications device 28.

The data communications device 28 is capable of operating as a reverse proxy on behalf of the servers 24 (i.e., as a front-end to the servers 24) for distributing streaming content. In particular, the data communications device 28 is capable of coordinating an RTSP session between a client 26 and one of the servers 24 such that the signals of each channel of the RTSP session are properly and consistently conveyed to the correct server 24, and not misdirected to the wrong server 24 or dropped. To this end, the data communications device 28 utilizes a network address translation (NAT) data structure (e.g., a NAT table) having an entry for each channel of the RTSP session. The entries are added to the NAT data structure at the same time, or near the time, in which the initial channel of the RTSP session is created. Accordingly, control information on other channels of the RTSP session (e.g., video control channel packets, audio control channel packets) can be properly directed to the correct server 24. Further details of the invention will now be provided with reference to FIG. 2.

Figure 2:
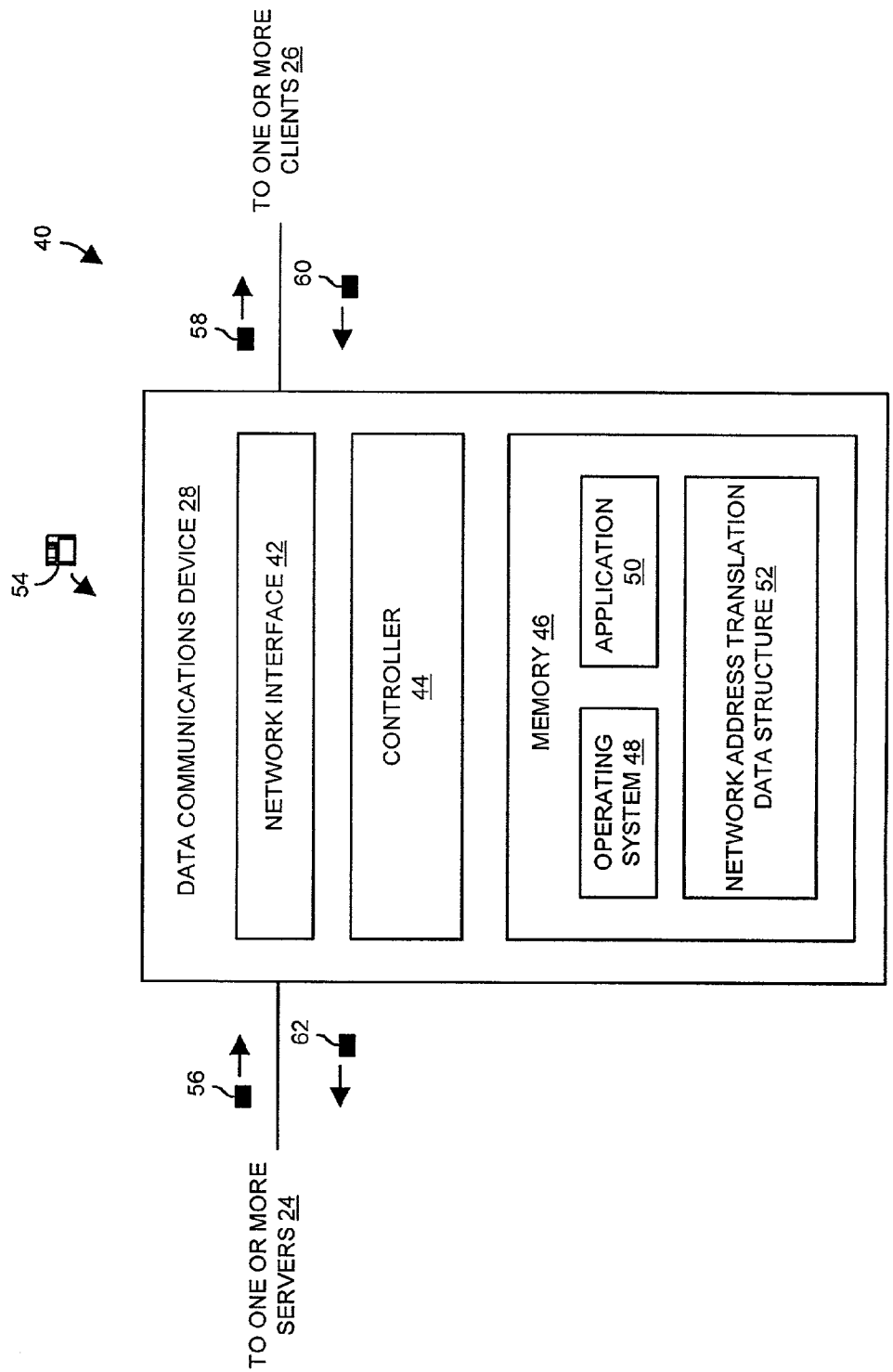
FIG. 2 is a block diagram of a data communications device of the network system of FIG. 1.

FIG. 2 shows a block diagram 40 of the data communications device 28 of FIG. 1. The data communications device 28 includes a network interface 42, a controller 44 and a memory 46. The memory 46 stores an operating system 48, an application 50 and a NAT data structure 52. In one arrangement, the controller 44 of the data communications device 28 conveys data elements (e.g., packets) between the servers 24 of the first network 22-A and the clients 26 of the second network 22-B through the network interface 42. In one arrangement, the controller 44 is one or more processors executing the operating system 48 (e.g., in order to share resources) and the application 50 (e.g., routing programs). In one arrangement, the NAT data structure 52 is a table (e.g., a linked list or similar memory construct) of NAT entries which the controller 44 uses to translate network addresses for the data elements conveyed between the first and second networks 22-A, 22-B.

In one arrangement, one or more of the operating system 48 and the application 50 includes instructions which are delivered to the memory 46 from a computer program product 54 having a computer readable medium (e.g., a CD-ROM, a diskette, tape, etc.). In another arrangement, one or more of the operating system 48 and the application 50 are delivered by way of a propagated signal (e.g., via a network download).

As shown in FIG. 2, the controller 44 of the data communications device 28 is capable of (i) receiving a data element 56 from a server 24, (ii) performing a NAT operation on the source address of the data element 56 in order to generate a new data element 58 which carries the data of the data element 56, and (iii) sending the data element 58 to a client 26 so that the client 26 (a) is unaware of the existence of the server 24 and (b) perceives the data communications device 28 as the originator of the data. Additionally, the controller 44 of the data communications device 28 is capable of (i) receiving a data element 60 from a client 26, (ii) performing a NAT operation on the destination address of the data element 60 in order to generate a new data element 62 which carries the data of the data element 60, and (iii) sending the data element 62 to a server 24 so that the server 24. Further details of how the data communications device 28 operates when supporting an RTSP session will now be provided with reference to FIG. 3.

Figure 3:
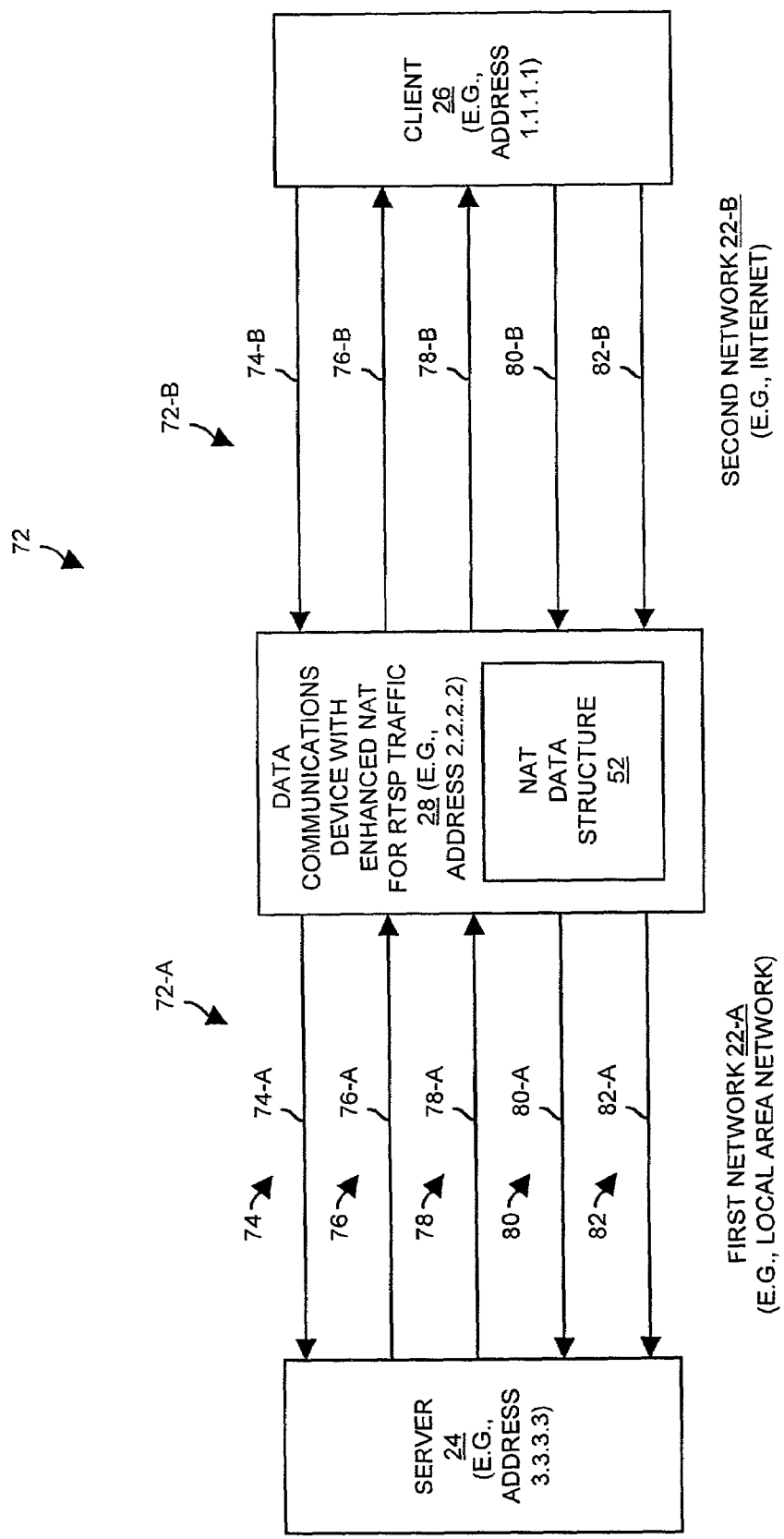
FIG. 3 is a block diagram illustrating particular communications which flow within the network system of FIG. 1.

FIG. 3 shows a block diagram of an RTSP session 70 between one of the clients 26 of the network 22-B and one of the servers 24 of the network 22-A through the data communications device 28. The RTSP session 70 includes an RTSP control channel 74, a video channel 76, an audio channel 78, a video control channel 80, and an audio control channel 82. The RTSP control channel 74 is a TCP connection which is formed in response to a SYN packet sent from the client 24 to data communications device 28 in order to begin an RTSP session. Upon receipt of the SYN packet, the data communications device 28 selects the server 24 from the multiple servers 24 (e.g., in a round-robin manner, also see FIG. 1), adds a NAT entry to the NAT data structure 52 so that it can direct that packet and future packets from the client 26 to the selected server 24, and forwards the packet onto the selected server 24. As a result, the RTSP control channel 74 is now formed and consists of a first portion 74-A between the selected server 24 and the data communications device 28, and second portion 74-B between the data communications device 28 and the client 26. The server 24 and the client 26 can then use the RTSP control channel 74 for exchanging control information such as for negotiating the use of port numbers for the UDP channels.

The selected server 24 then provides the video channel 76 of the RTSP session 70 (i.e., a sequence of video channel UDP packets containing a stream of video data), and the audio channel 78 of the RTSP session 70 (i.e., a sequence of audio channel UDP packets 78 containing a stream of audio data). When the data communications device 28 receives the first video channel UDP packet, the data communications device (i) adjusts the NAT data structure (e.g., adds an entry to a NAT table in order to handle any response packets) and (ii) properly directs that video channel UDP packet (and future video channel UDP packets) from the selected server 24 to the client 26 that began the RTSP session. At the same time, the data communications device 28 further adjusts the NAT data structure 52 (e.g., adds another entry to the NAT table) in order to properly direct any video control channel UDP packets from that client 26 back to the selected server 24. When the client 26 receives the video channel UDP packets 76, the client 26 provides the video control channel 80 back to the selected server 24, i.e., sends video control channel UDP packets back to the data communications device 28 which operates as a reverse proxy on behalf of the multiple servers 24. Since the data communications device 28 has adjusted the NAT data structure 52 to properly direct such video control channel UDP packets back to the selected server 24, there is no misdirection or dropping of video control channel UDP packets as in conventional systems. Rather, the selected server 24 which provides the video channel 76 receives the video control channel 80 and can thus maintain and/or modify the video channel 76 to accommodate the client 26.

In a similar manner, when the data communications device 28 receives the first audio channel UDP packet of the audio channel 78, the data communications device (i) configures the NAT data structure (e.g., adds an entry to a NAT table to handle any response packets), and (ii) properly directs that audio channel UDP packet and future audio channel UDP packets from the selected server 24 to the client 26 that began the RTSP session. At the same time, the data communications device 28 further configures the NAT data structure 52 (e.g., adds another entry to the NAT table) to properly direct any audio control channel UDP packets from that client 26 back to the selected server 24. When the client 26 receives the audio channel UDP packets 78, the client 26 provides the audio control channel 82 back to the selected server 24, i.e., sends audio control channel UDP packets back to the data communications device 28 which operates as a reverse proxy on behalf of the multiple servers 24. Since the data communications device 28 has configured the NAT data structure 52 to properly direct such audio control channel UDP packets back to the selected server 24, there is no misdirection or dropping of audio control channel UDP packets as in conventional systems. Rather, the selected server 24, which provides the audio channel 78, receives the audio control channel 82 and can thus maintain and/or modify the audio channel 78 to accommodate the client 26.

FIG. 4 is a block diagram of a NAT table 90 which is suitable for use as the NAT data structure 52. The NAT table 90 includes a series of NAT entries 92-1, 92-2, . . . (collectively, NAT entries 92) which the controller 44 uses for network address translation operations (also see FIG. 2). To this end, the controller 44 is configured to apply a rule-based procedure (e.g., a rule, an analysis, a computation, etc.) to detect the first UDP packet of the video channel 76 and the first UDP packet of the audio channel 78 from the server 24 (also see FIG. 3). In one arrangement, the controller 44 inspects the port number of the UDP packets received by the data communications device 28. If the port number of a UDP packet from the server 24 is in the range designated by RTSP (i.e., 6970 through 7170), the controller 44 concludes that the UDP packet is for a video or audio channel of an RTSP session 70. In response, the controller 44 inspects the NAT table 90 to determine whether a NAT entry 92 exists for translating a network address of UDP packet. If such an entry 92 exists, the controller 44 performs a network address translation on the UDP packet. However, if such an entry 92 does not exist, the controller 44 adds a new entry 92 (e.g., the NAT entry 92-1) to the NAT table 90 in order to configure the NAT table 90 for network address translation of subsequent UDP packets for the video or audio channel and, at or near the same time, adds a second new entry 92 (e.g., the NAT entry 92-2) to the NAT table 90 in order to configure the NAT table 90 for network address translation of UDP packets for corresponding video control or audio control channel packets coming back from the client 26 to the server 24. Accordingly, the data communications device 28 is capable of properly directing both UDP channel and UDP control channel packets for RTSP sessions between clients 26 and multiple servers 24 in a reverse proxy manner. UDP control channel packets are not inadvertently dropped or misdirected as in the earlier-described conventional approach to operating as a reverse proxy for multiple servers.

By way of example only and with reference to FIGS. 3 and 4, suppose that the client 26 has an address of 1.1.1.1, and that the data communications device 28 has an address of 2.2.2.2 from the perspective of the second network 22-B. Additionally, suppose that the server 24 of FIG. 3 has an address of 3.3.3.3 from the perspective of the first network 22-A, and cannot be directly reached by the client 26. The NAT table 90 of FIG. 4 is configured to properly direct a UDP channel (e.g., UDP packets of a video channel) of an RTSP session from the server 24 to the client 26, and to properly direct a corresponding UDP control channel (e.g., UDP packets of a video control channel) from the client 26 back to the same server 24. For example, the data communications device 28 can receive a UDP channel packet (e.g., a video channel packet) having a destination address and destination port number of 1.1.1.1/5555 and a source address and source port number of 3.3.3.3/6970 from the server 24. In response to that packet, the data communications device 28 looks into the NAT table 90 and finds entry 92-1 which is capable of translating the source address of that packet into the source address of the data communications device 28. Accordingly, the data communications device 28 performs the translation and passes a packet containing a source address and source port number of 2.2.2.2/6970 onto the second network 22-B for receipt by the client 26. As a result, the data communications device 28 appears as the originator of the UDP channel packet.

Similarly, the data communications device 28 can receive a UDP control channel packet (e.g., a video control channel packet) having a destination address and destination port number of 2.2.2.2/6971 and a source address and source port number of 1.1.1.1/5556 from the client 26 (e.g., containing video channel control information relating to the video channel). In response to that packet, the data communications device 28 looks into the NAT table 90 and finds entry 92-2 which was created at or near the same time as the entry 92-1 and which is capable of translating the destination address of that packet into the destination address of the server 24 (among the multiple servers 24, see FIG. 1). Accordingly, the data communications device 28 performs the translation and passes a packet containing a destination address and destination port number of 3.3.3.3/6971 onto the server 24. As a result, the data communications device 28 properly directs the UDP control channel packet to the correct server 24. Further details of the invention will now be provided with reference to FIG. 5.

Figure 5:
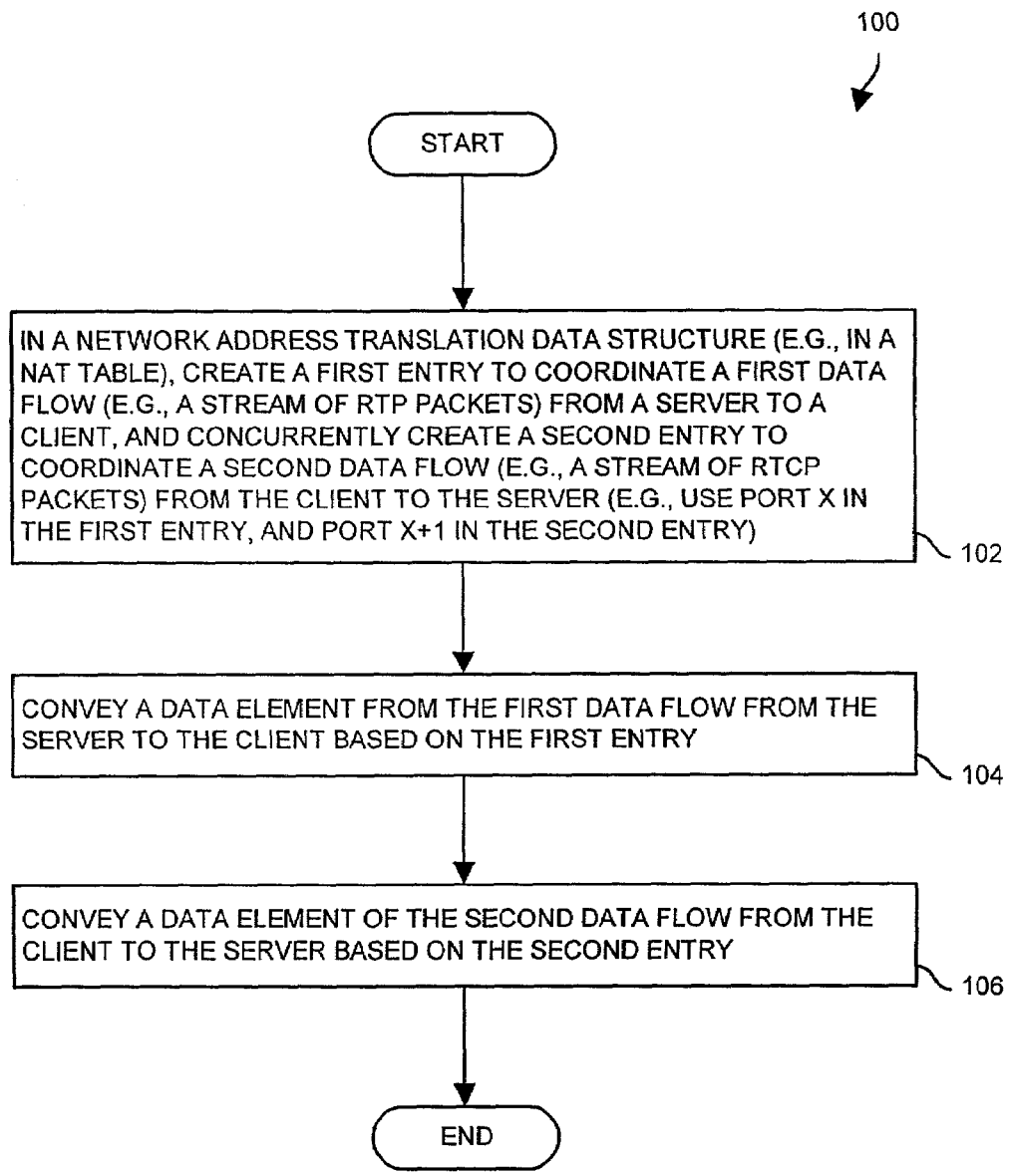
FIG. 5 is a flowchart of a procedure which is performed by the data communications device of FIG. 2.

FIG. 5 shows a procedure 100 which is performed by the controller 44 of the data communications device 28 (also see FIG. 2) during an RTSP session in order to facilitate proper direction of UDP packets for a video or audio control channel. In step 102, the controller 44 (i) creates, in the NAT data structure 52 (e.g., the NAT table 90 of FIG. 4), a first entry (e.g., the NAT entry 92-1 in FIG. 4) to coordinate a first flow of packets (i.e., a stream of real-time video or audio data) from a server 24 to a client 26 and (ii) concurrently creates a second entry to coordinate a second flow of packets (i.e., a series of video control or audio control packets) from the client 26 to the server 24. In one arrangement, the controller 44 sets up the entries so that the first entry applies to packets on port number X, and the second entry applies to packets on port number X+1 (e.g., thus forming an N-tuple of NAT entries). Accordingly, the controller 44 can handle RTSP packets (e.g., UDP packets in the predetermined port range of 6970 through 7170 to expect packets with port number X+1 to comply with the RTSP standard. Such operation is well-suited for RTSP in which the port numbers are chosen dynamically via the RTSP control channel (i.e., the TCP connection 74 in FIG. 3).

In step 104, the controller 44 conveys a data element (i.e., the initial UDP packet of a video or audio channel) from the first data flow from the server 24 to the client 26 based on the first entry.

In step 106, the controller 44 conveys a data element from the second data flow from the client 26 to the server based on the second entry. Accordingly, video control channel UDP packets and audio control channel UDP packets can be properly directed to the correct server 24 for use in adjusting and maintaining the video channel UDP packets and the audio channel UDP packets of the RTSP session. There is no misdirection or dropping of control channel packets because the second entry is made at or near the same time as the first entry rather than independently as in conventional approaches.

Figure 6:
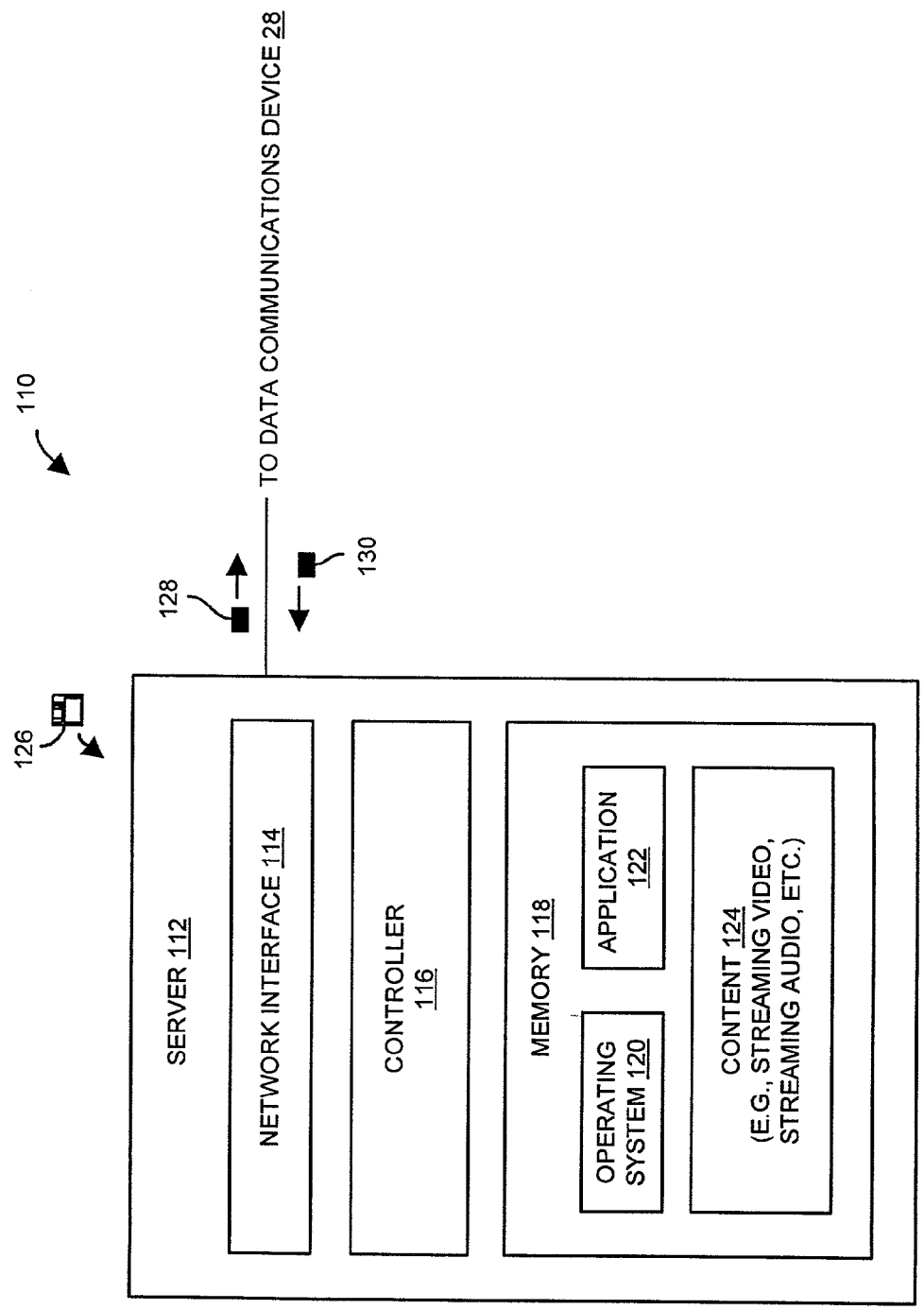
FIG. 6 is a block diagram of a server which is suitable for use in the network system of FIG. 1.

FIG. 6 is a block diagram 110 of a server 112 which is suitable for use as any of the servers 24 of FIG. 1. The server 112 includes a network interface 114, a controller 116 and a memory 118. The memory 118 stores an operating system 120, an application 122 and content 124. At least one of the operating system 120 and the application 122 can be installed from a computer program product 126 (e.g., a CD-ROM, a diskettes, a tape, etc.). In one arrangement, the content 124 includes video content for the video channel 76 and audio content for the audio channel 78 (also see FIG. 3).

The server 112 is capable of receiving signals 128 from the data communications device 28, and sending signals 130 to the data communications device 28. In one arrangement, for an RTSP session, the server 112 receives packets of an RTSP control channel (a TCP connection), provides packets for a video channel (video channel UDP packets), provides packets for an audio channel (audio channel UDP packets), receives packets for a video control channel (video control channel UDP packets) and receives packets for an audio control channel (audio control channel UDP packets) without having any additional communications to the data communications device for adjusting the NAT data structure 52 stored in the memory 46 of the data communications device 28 (also see FIG. 2). As such, the data communications device 28 performs a procedure to ensure that the packets of each channel are directed properly, e.g., rule-based computations and adjustments to the NAT data structure 52 to make sure that video and audio control channel packets are sent to the correct server 24. The server 24 can then adjust the video and audio channels based on the video and audio control channel communications.

In another arrangement, the server 24 is capable of providing additional communications to the data communications device 28 in order to adjust the NAT data structure 52 stored in the memory 46 of the data communications device 28. In particular, in accordance with the application 122 (FIG. 6), the server 24 is configured to send a command to the data communications device 28 expressly instructing the data communications device 28 to create an additional NAT entry. For example, in response to a request from a client 26 to establish an RTSP session (e.g., in response to a SYN packet from the client 26 resulting in formation of a TCP connection through which port numbers for UDP channels are negotiated), the server 24 can begin sending a video channel to the client 26 and, at or near the same time, send a command to the data communications device 28 instructing the data communications device 28 to create a NAT entry in the NAT data structure 52 (e.g., see the NAT entry 92 in the NAT table 90 of FIG. 4) for the returning video control channel from the client 26. Additionally, the server 24 can begin sending an audio channel to the client 26 and, at or near the same time, send another command to the data communications device 28 instructing the data communications device 28 to create a NAT entry in the NAT data structure 52 for the returning audio control channel from the client 26. In this arrangement, there is no need for the data communications device 28 to run any rule-based computation on the packets in order to automatically create extra NAT entries. Rather, the server 24 is responsible for expressly instructing the data communications device 28 to create such entries.

In one arrangement, the UDP video (or audio) channel uses port Y and the command, which the server 24 sends to the client 26 is a packet that uses port Y+1 and that has a time-to-live (TTL) value (e.g., 2) that expires before it can reach the client 26. Thus, the data communications device 28 receives the packet and creates a NAT entry for return packets from the client 26 to the server 24 using port Y+1. That is, the server 24 sends a packet to the client 26 through the network interface 114 (FIG. 6) and the data communications device 28 to configure the NAT data structure 52 within the data communications device 28 for the UDP video (or audio) control channel on port Y+1. Accordingly, the data communications device 28 is now configured to properly direct the UDP video (or audio) control channel on port Y+1 from the client 26 to the correct server 24.

In another arrangement, the command from the server 24 to the data communications device 28 is a specialized instruction (e.g., a function or routine call using an API) which addresses the data communications device 28 and, upon receipt, directs the data communications device 28 to create the NAT entry for the UDP video (or audio) control channel. Further details of this feature will now be provided with reference to FIG. 7.

Figure 7:
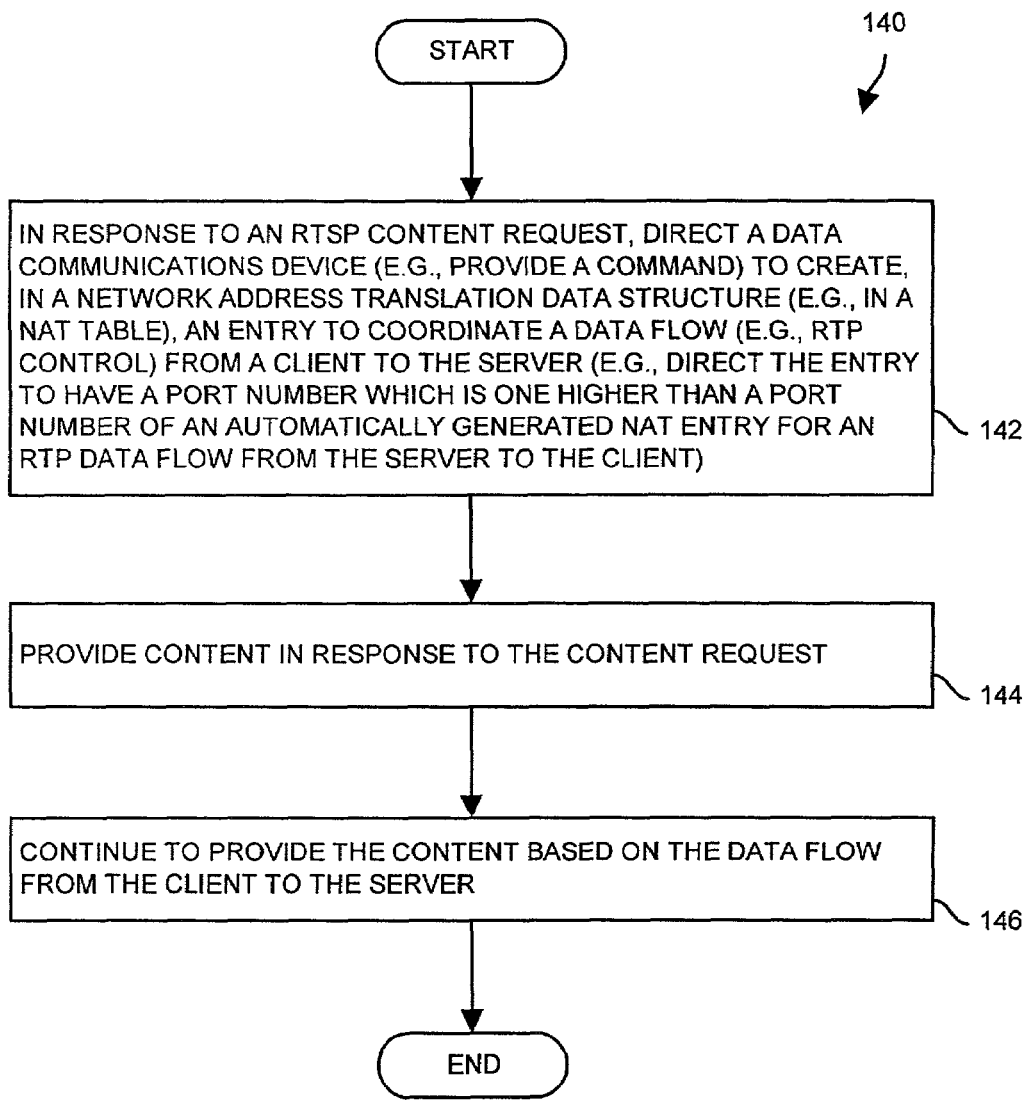
FIG. 7 is a flowchart of a procedure which is performed by the server of FIG. 6.

FIG. 7 shows a flowchart of a procedure 140 which is performed by the controller 116 of the server 24 when expressly directing the data communications device 28 to create a NAT entry in the NAT data structure 52 during establishment of an RTSP session. In step 142, the controller 116 receives an RTSP content request (e.g., a SYN packet) from the client 26 and, in response thereto, directs the data communications device 28 (e.g., with a packet addressing the client and with a short TTL value, a packet addressing the data communications device 28 with a special function call, etc.) to create, in the NAT data structure 52, an entry to coordinate a data flow from the client 26 to the server 24. In one arrangement, the data flow is a control channel (e.g., a video control channel, an audio control channel, both, etc.) of the RTSP session and the server expressly designates the port number for the created NAT entry. For example, in the case of RTSP, the created NAT entry should have a port number which is one higher (i.e., X+1) than the port number (e.g., X) of the associated content channel (e.g., a video channel, an audio channel, both etc.).

In step 144, the server 24 provides content (e.g., streaming video, streaming audio, both, etc.) in response to the content request. Step 144 can occur concurrently with step 142, or shortly before or after step 142. In all cases, the data communications device 28 is ready to properly direct the data flow (e.g., control channel packets) from the client 26 in response to the provided content back to the correct server 24.

In step 146, the server 24 continues to provide the content based on the data flow from the client 26 to the server 24. For example, the server 24 can adjust the transmission rate of the content to better match the content delivery bandwidth of the RTSP session. Further details of the invention will now be provided with reference to FIG. 8.

Figure 8:
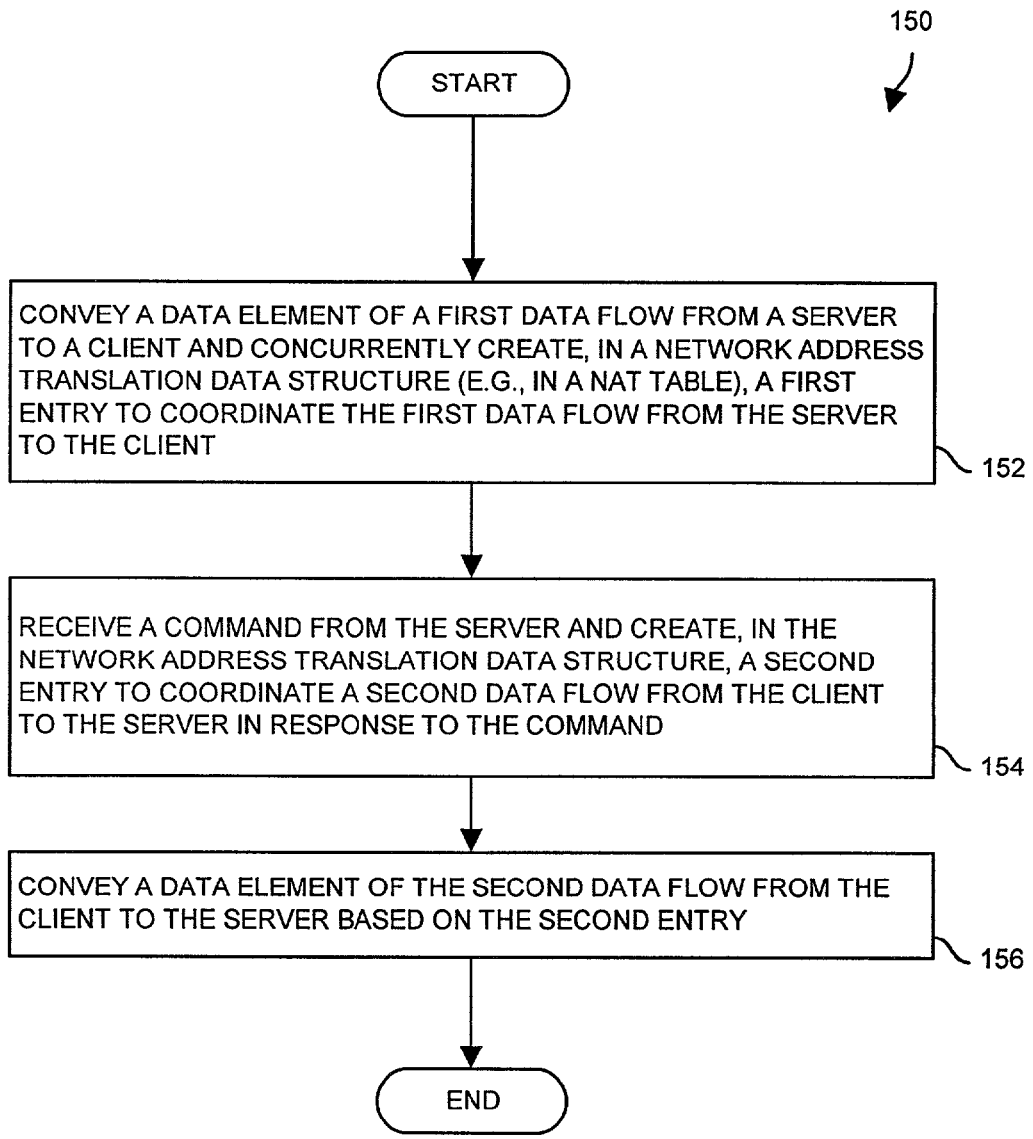
FIG. 8 is a flowchart of a procedure which is a suitable alternative to that of FIG. 5, and which is suitable for use with the server of FIG. 6.

FIG. 8 is a flowchart of a procedure 150 which is a suitable alternative to the procedure 100 of FIG. 5, and which is suitable for use with a server 24 operating in accordance with the procedure 140 of FIG. 7. In step 152, the data communications device 28 conveys a data element of a first data flow from the server 24 to a client 26 and concurrently creates, in the NAT data structure 52, a first entry to coordinate the first data flow (e.g., streaming content) from the server 24 to the client 26. For example, the data communications device 28 can receive a first packet of a video (or audio) channel of an RTSP session, add a NAT entry to the NAT data structure 52, and direct that packet onto the client 26 (e.g., operating in a reverse-proxy-like manner so that the client 26 perceives the data communications device 28 as the originator of the channel).

In step 154, the data communications device 28 receives a command from the server 24 and creates, in the NAT data structure 52, a second entry to coordinate a second data flow (control information) from the client 26 to the server 24 in response to the command. In one arrangement, the command is a packet that addresses the client 26 and that has a short TTL value (e.g., 2) so that it never reaches the client 26 but causes creation of a NAT entry for packets of the same port number from the client 26 back to the server 24. In another arrangement, the data communications device 28 operates in compliance with a specialized application (e.g., see the application 50 in FIG. 2) to create the second entry in the NAT data structure 52 upon receipt of a command (a packet addressing the data communications device 28 which includes an API call to the application 50) at or near the time of step 152. Accordingly, the data communications device 28 is now properly configured to direct the second data flow from the client 26 to the correct server 24. As a result, there is no misdirection of information (i.e., misdirection of video or audio control channel packets) or dropping of such information.

In step 156, the data communications device 28 conveys a data element of the second data flow (e.g., a UDP packet of a video or audio control channel of an RTSP session) to the server 24 that provides the first data flow (e.g., the streaming content). Accordingly, the server 24 can use information in the second data flow to control the first data flow (e.g., adjust the transmission rate of the first data flow). Additionally, the data communications device 28 does not need to apply rule-based computation thus removing any additional burden on the controller 44 (see FIG. 2). As such, the data communications device 28 is free to perform more standard data communications operations.

As described above, the invention is directed to techniques for managing network traffic (e.g., RTSP traffic) using NAT by creating an additional NAT entry for a second communications channel at the same time or near the time in which an initial NAT entry for a first communications channel is created. Such techniques can facilitate certain types of communications (e.g., video and audio control channels for an RTSP session) between a client 26 on one end, and a selected one of multiple servers 24 on the other end. As described earlier, such operation can prevent a situation in which a data communications device 28, such as a reverse proxy gateway, receives a UDP packet for a video control channel or an audio control channel of an RTSP session, but does not know where to direct it. The features of the invention, as described above, may be employed in networks, apparatus and procedures, as well as other computer-related devices such as those of Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the data communications device 28 was explained above as being configured for one-direction NAT by way of example only. In some arrangements, the data communications device 28 performs NAT in two directions, i.e., double-NAT, so that the servers 24 view the data communications device 28 as being the originator of RTSP sessions which are actually initiated by the clients 26.

Additionally, it should be understood that the above-described operations of the data communications device 28 and the servers 24 were made in the context of handling RTSP session by way of example only. The techniques of the invention are suitable for use by other protocols and types of communications as well. For example, any other communication that uses multiple channels can utilize the invention so that NAT entries are created for each channel in a consistent and correct manner, thus preventing subsequent misdirection of packets.

Furthermore, it should be understood that the above-described creating of NAT entries involved adding a first NAT entry having a port number X for packets from the server 24 to the client 26, and a second NAT entry having a port number X+1 for packets from the client 26 to the server, by way of example only. Such operation is well-suited for RTSP since the protocol requires the video and audio control channel port numbers to be one higher than the video and audio channel port numbers. For other protocols, the data communications device 28 can create the second entries so that the port number are not simply one higher (e.g., arbitrarily set port numbers, port numbers set in a particular range, hard-coded port numbers, etc.). Such operation can occur in response to rule-base operations (e.g., computations) within the data communications device 28 itself, or in response to commands from the server 24.

Additionally, the techniques of the invention can be combined with other protocols. For example, when the data communications device operates as a proxy, the control channel packets can be encrypted so that the control channel packets from the client 26 to the server 24 cannot be monitored by the data communications device. Nevertheless, the routing of such packets still works since the NAT entries for the control channel packets are established at or near the time of configuring the NAT data structure 52 for data flows from the server 24 the client 26.

Furthermore, it should be understood that the networks 22-A, 22-B were described as including transmission media 32-A, 32-B by way of example only. In other arrangements, the clients 26 and/or the servers 24 are connected to the data communications device 28 at different distances that what is shown (e.g., connected directly to the data communications device 28, varying distances, nearer the clients 26, nearer the servers 24, in enterprise firewall configurations, etc.). Such modifications and enhancements are intended to be part of particular embodiments of the invention.

What is claimed is:

1. In a data communications device having a network address translation data structure, a method for managing network traffic using network address translation, the method comprising the steps of:

in the network address translation data structure, creating a first entry to coordinate a first data flow from a server to a client, and concurrently creating a second entry to coordinate a second data flow from the client to the server;

conveying a data element of the first data flow from the server to the client based on the first entry; and conveying a data element of the second data flow from the client to the server based on the second entry;
wherein:
the network traffic includes Real-Time Streaming Protocol packets, the data element of the first data flow is a Real-Time Transport Protocol packet, and the data element of the second data flow is a Real-Time Transport Protocol Control Protocol packet;
the Real-Time Transport Protocol (RTP) packet includes a first address and a first port number of the server and an address and a first port number of the client, the first address of the server being locally defined on a first network including a plurality of servers from which the RTP packet is sent to the client;
the Real-Time Transport Control Protocol (RTCP) packet includes the address and a second port number of the client and the second address and a second port number of the server, the second address of the server uniquely identifying the server on a second network over which the RTCP packet travels to reach the server, the second port numbers of the client and server being distinct from the first port numbers of the client and server respectively but having predetermined relationships therewith as established by the RTSP session;
the first and second entries of the network address translation (NAT) data structure are created in response to receipt of the RTP packet, and each entry includes respective first network data and second network data:
the first network data of the first entry includes the first address and the first port number of the server and the address and first port number of the client, and the second network data of the first entry includes the second address and the first port number of the server and the address and the first port number of the client;
the first network data of the second entry includes the address and the second port number of the client and the first address and the second port number of the server, and the second network data of the second entry includes the address and the second port number of the client and the second address and the second port number of the server;
conveying the data element of the first data flow comprises (1) utilizing the first entry of the NAT data structure to translate the first address of the server in the RTP packet to the second address of the server, and (2) forwarding the translated RTP packet to the client; and
conveying the data element of the second data flow comprises (1) utilizing the second entry of the NAT data structure to translate the second address of the server in the RTCP packet to the first address of the server, and (2) forwarding the translated RTCP packet to the server.

2. A data communications device, comprising:
a network interface which is capable of connecting to a client and a server;
memory to store a network address translation data structure; and
a controller coupled to the network interface and the memory, the controller being configured to:
in the network address translation data structure stored in the memory, create a first entry to coordinate a first data flow from the server to the client, and concurrently create a second entry to coordinate a second data flow from the client to the server,
based on the first entry, convey a data element of the first data flow from the server to the client through the network interface, and
based on the second entry, convey a data element of the second data flow from the client to the server through the network interface:
and wherein:
the network traffic includes Real-Time Streaming Protocol packets, the data element of the first data flow is a Real-Time Transport Protocol packet, and the data element of the second data flow is a Real-Time Transport Protocol Control Protocol packet;
the Real-Time Transport Protocol (RTP) packet includes a first address and a first port number of the server and an address and a first port number of the client, the first address of the server being locally defined on a first network including a plurality of servers from which the RTP packet is sent to the client;
the Real-Time Transport Control Protocol (RTCP) packet includes the address and a second port number of the client and the second address and a second port number of the server, the second address of the server uniquely identifying the server on a second network over which the RTCP packet travels to reach the server, the second port numbers of the client and server being distinct from the first port numbers of the client and server respectively but having predetermined relationships therewith as established by the RTSP session;
the first and second entries of the network address translation (NAT) data structure are created by the controller in response to receipt of the RTP packet, and each entry includes respective first network data and second network data:
the first network data of the first entry includes the first address and the first port number of the server and the address and first port number of the client, and the second network data of the first entry includes the second address and the first port number of the server and the address and the first port number of the client;
the first network data of the second entry includes the address and the second port number of the client and the first address and the second port number of the server, and the second network data of the second entry includes the address and the second port number of the client and the second address and the second port number of the server;
the controller is operative when conveying the data element of the first data flow to (1) utilize the first entry of the NAT data structure to translate the first address of the server in the RTP packet to the second address of the server, and (2) forward the translated RTP packet to the client; and
the controller is operative when conveying the data element of the second data flow to (1) utilize the second entry of the NAT data structure to translate the second address of the server in the RTCP packet to the first address of the server, and (2) forward the translated RTCP packet to the server.

3. In a data communications device having a network address translation data structure, a method for managing network traffic using network address translation, the method comprising the steps of:

conveying a data element of a first data flow from a server to a client and concurrently creating, in the network address translation data structure, a first entry to coordinate the first data flow from the server to the client;

receiving a command from the server and creating, in the network address translation data structure, a second entry to coordinate a second data flow from the client to the server in response to the command; and conveying a data element of the second data flow from the client to the server based on the second entry;

wherein:

the network traffic includes Real-Time Streaming Protocol packets, the data element of the first data flow is a Real-Time Transport Protocol packet, and the data element of the second data flow is a Real-Time Transport Protocol Control Protocol packet;

the Real-Time Transport Protocol (RTP) packet includes a first address and a first port number of the server and an address and a first port number of the client, the first address of the server being locally defined on a first network including a plurality of servers from which the RTP packet is sent to the client;

the Real-Time Transport Control Protocol (RTCP) packet includes the address and a second port number of the client and the second address and a second port number of the server, the second address of the server uniquely identifying the server on a second network over which the RTCP packet travels to reach the server, the second port numbers of the client and server being distinct from the first port numbers of the client and server respectively but having predetermined relationships therewith as established by the RTSP session;

the first entry of the network address translation (NAT) data structure is created in response to receipt of the RTP packet;

the second entry of the NAT data structure is created in response to a command from the server prior to the generation of the RTCP packet;

each entry of the NAT data structure includes respective first network data and second network data:

the first network data of the first entry includes the first address and the first port number of the server and the address and first port number of the client, and the second network data of the first entry includes the second address and the first port number of the server and the address and the first port number of the client;

the first network data of the second entry includes the address and the second port number of the client and the first address and the second port number of the server, and the second network data of the second entry includes the address and the second port number of the client and the second address and the second port number of the server;

conveying the data element of the first data flow comprises (1) utilizing the first entry of the NAT data structure to translate the first address of the server in the RTP packet to the second address of the server, and (2) forwarding the translated RTP packet to the client; and conveying the data element of the second data flow comprises (1) utilizing the second entry of the NAT data structure to translate the second address of the server in the RTCP packet to the first address of the server, and (2) forwarding the translated RTCP packet to the server.

4. A data communications device, comprising a network interface which is capable of connecting to a client and a server;

memory to store a network address translation data structure; and a controller coupled to the network interface and the memory, the controller being configured to:

convey a data element of a first data flow from a server to a client and concurrently create, in the network address translation data structure, a first entry to coordinate the first data flow from the server to the client;

receive a command from the server and create, in the network address translation data structure, a second entry to coordinate a second data flow from the client to the server in response to the command; and convey a data element of the second data flow from the client to the server based on the second entry, and wherein:

the network traffic includes Real-Time Streaming Protocol packets, wherein the data element of the first data flow is a Real-Time Transport Protocol packet, and wherein the data element of the second data flow is a Real-Time Transport Protocol Control Protocol packet;

the Real-Time Transport Protocol (RTP) packet includes a first address and a first port number of the server and an address and a first port number of the client, the first address of the server being locally defined on a first network including a plurality of servers from which the RTP packet is sent to the client;

the Real-Time Transport Control Protocol (RTCP) packet includes the address and a second port number of the client and the second address and a second port number of the server, the second address of the server uniquely identifying the server on a second network over which the RTCP packet travels to reach the server, the second port numbers of the client and server being distinct from the first port numbers of the client and server respectively but having predetermined relationships therewith as established by the RTSP session;

the controller is operative to create the first entry of the network address translation (NAT) data structure in response to receipt of the RTP packet;

the controller is operative to create the second entry of the NAT data structure in response to receipt of a command from the server prior to the generation of the RTCP packet;

each entry of the NAT data structure includes respective first network data and second network data;

the first network data of the first entry includes the first address and the first port number of the server and the address and first port number of the client, and the second network data of the first entry includes the second address and the first port number of the server and the address and the first port number of the client;

the first network data of the second entry includes the address and the second port number of the client and the first address and the second port number of the server, and the second network data of the second entry includes the address and the second port number of the client and the second address and the second port number of the server;

the controller is operative when conveying the data element of the first data flow to (1) utilize the first entry of the NAT data structure to translate the first address of the server in the RTP packet to the second address of the server, and (2) forward the translated RTP packet to the client; and the controller is operative when conveying the data element of the second data flow to (1) utilize the second entry of the NAT data structure to translate the second address of the server in the RTCP packet to the first address of the server, and (2) forward the translated RTCP packet to the server.

* * * * *